United States Patent [19]

Hosaka

[11] Patent Number: 4,753,857
[45] Date of Patent: Jun. 28, 1988

[54] LAMINATED FUEL CELL

[75] Inventor: Minoru Hosaka, Tokyo, Japan

[73] Assignee: Ishikawajima-Harima Jukogyo Kabushiki Kaisha, Japan

[21] Appl. No.: 887,185

[22] Filed: Sep. 10, 1986

Related U.S. Application Data

[62] Division of Ser. No. 738,966, May 29, 1985.

[30] Foreign Application Priority Data

May 29, 1984 [JP] Japan ................... 59-109260

[51] Int. Cl.4 .................................. H01M 8/24
[52] U.S. Cl. .............................. 429/38; 429/39
[58] Field of Search ............ 429/35, 36, 38, 39, 429/34

[56] References Cited

U.S. PATENT DOCUMENTS

| | | | |
|---|---|---|---|
| 3,188,242 | 6/1965 | Kordesch et al. | 429/36 |
| 3,442,714 | 5/1969 | Matsuno | 429/35 |
| 3,530,003 | 9/1970 | Warszawski et al. | 429/39 |
| 3,814,631 | 6/1974 | Warszawski et al. | 429/39 |
| 4,160,856 | 7/1979 | Warszawski | 429/34 |
| 4,579,788 | 4/1986 | Marianowski et al. | 429/36 |

Primary Examiner—Donald L. Walton

[57] ABSTRACT

In an internal manifold type laminated fuel cell, in order to feed two kinds of gases to a cathode and an anode, respectively, through a separator plate, spacers for separately supplying the gases to the cathode and the anode, respectively, are disposed over the surfaces, respectively, of the separator plate, whereby separation and sealing between the two gases are ensured.

3 Claims, 5 Drawing Sheets

LAMINATED FUEL CELL

This is a division of application Ser. No. 738,996, filed May 29, 1985.

BACKGROUND OF THE INVENTION

The present invention relates to an internal manifold type laminated fuel cell.

There has been devised and demonstrated a molten-carbonate type laminated fuel cell as shown in FIG. 1. An electrolytic plate in the form of a tile 1 is of the matrix type in which a carbonate such as $Li_2CO_3$—$K_2CO_3$ eutectic impregnated into porous materials or of the paste type in which a carbonate and its support materials are molded by a press. The tile 1 is sandwiched between a cathode 2 and an anode 3 and a fuel 5 such as $H_2$ gas is supplied to the anode 3 while an oxidizing gas 4 comprising air containing $CO_2$ is supplied to the cathode 2. Then the following reaction takes place on the side of the cathode 2:

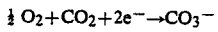

and the following reaction takes place on the side of the anode 3:

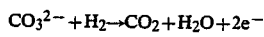

As a result, electric power is produced due to the potential difference between the cathode 2 and the anode 3 which sandwich the tile 1 which is a carbonate-ion conductor. The cathodes, tiles and anodes are laminated through current collectors 6 into a stack, whereby a voltage is increased. In order to make the lamination compact in size, the current collector 6 may be in the form of a separator plate 8 which is corrugated as indicated by 7 so that the oxidizing gas 4 and the fuel 5 are introduced to the cathode 2 and the anode 3, respectively.

However, the laminated fuel cell as shown in FIG. 1 is an internal manifold system (internal branching) so that the oxidizing gas 4 and the fuel 5 are separately introduced through the tile 1 and the separator plate 8 in each layer to the cathode 2 and the anode 3, respectively, and then are discharged. Therefore, highly reliable sealability must be maintained. That is, because $H_2$ and $O_2$ coexist at high reaction temperatures (which are controlled between 600° and 700° C.), there is a danger of explosion of the $H_2$ and $O_2$ mixture; as a result, highly reliable sealability is very important. Furthermore, the laminated fuel cells must be simple in construction so that they can be assembled in a simple manner. Moreover, in order to improve the efficiency, the oxidizing gas 4 and the fuel 5 must be uniformly distributed over the surfaces of the cathode 2 and the anode 3, respectively.

In view of the above, the present invention has for its object to provide a laminated fuel cell which is simple in construction and in which an oxidizing gas and a fuel are separately fed to and discharged from a cathode and an anode while ensuring highly reliable sealability and uniform distribution.

The above and other objects, effects, features and advantages of the present invention will become more apparent from the following description of preferred embodiments thereof taken in conjunction with the accompanying drawings.

DETAILED DESCRIPTION OF THE PREFERRED EMBODIMENTS

Figure 1:
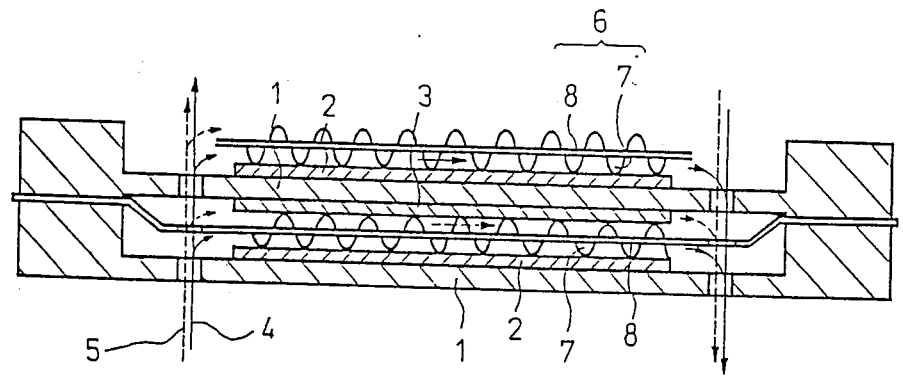
FIG. 1 is a sectional view of a conventional laminated fuel cell and is used to explain the underlying principle of a fuel cell.
Figure 2:
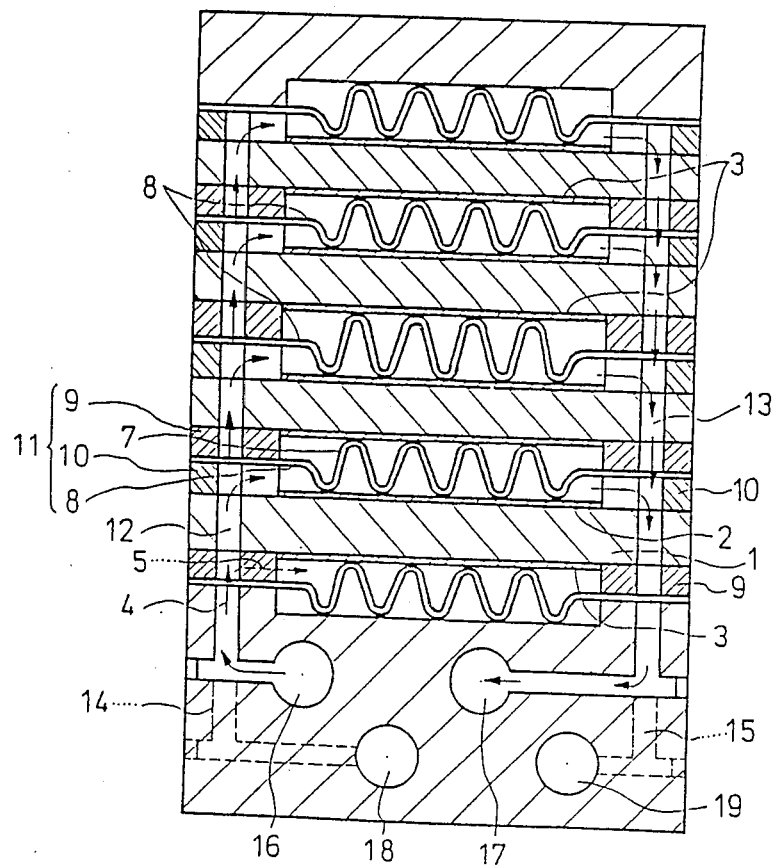
FIG. 2 is a longitudinal sectional view of a first embodiment of a laminated fuel cell in accordance with the present invention.

FIG. 2 shows a first embodiment of a laminated fuel cell in accordance with the present invention. Tiles 1 each of which is sandwiched between a cathode 2 and an anode 3 are laminated into a plurality of layers through current collector plate assemblies 11 each of which has a separator plate 8 with corrugations 7 and each of which has anode passage spacers 9 and cathode passage spacers 10 joined to both ends by for example brazing.

A plurality of oxidizing-gas passages 12 for supplying the oxidizing gas 4 to the cathode 2 extend through one side of the tiles 1 and the current collector plate assemblies 11 while a plurality of oxidizing-gas discharge passages 13 extend through the other side of the tiles 1 and the current collector plate assemblies 11. A plurality of fuel supply passages 14 and a plurality of fuel discharge passages 15 extend alternately of the oxidizing-gas supply passages 12 and the oxidizing-gas discharge passages 13, respectively. Reference numeral 16 denotes an oxidizing-gas inlet; 17, an oxidizing-gas outlet; 18, a fuel inlet; and 19, a fuel outlet.

Figure 3:
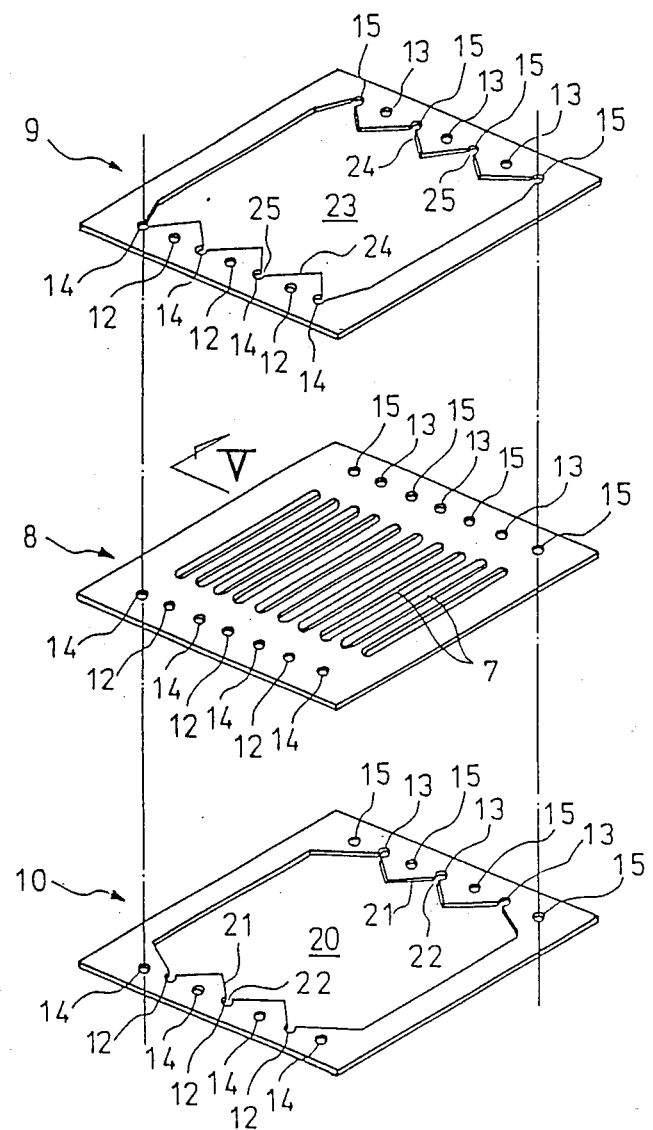
FIG. 3 is an exploded perspective view of a current collector plate assembly thereof.
Figure 4:
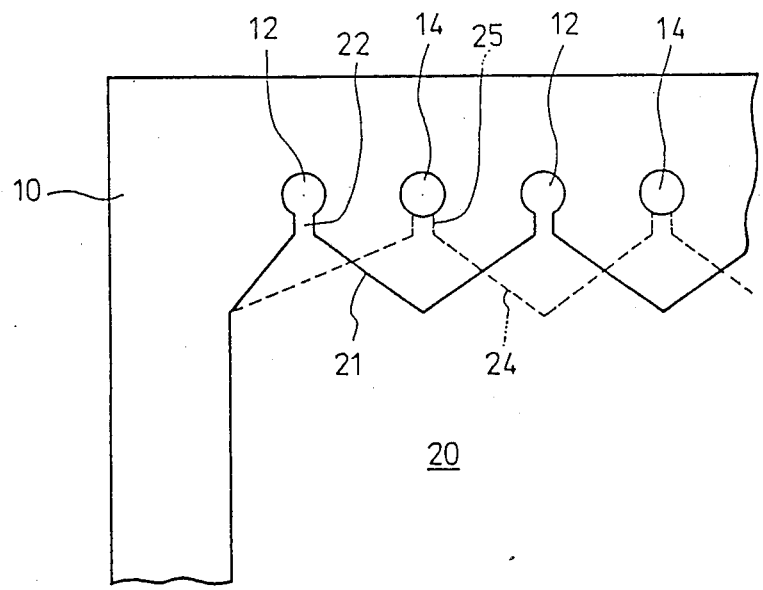
FIG. 4 is a view used to explain the gas separation effect of the current collector plate assembly shown in FIG. 2.

Referring next to FIG. 3, the cathode passage spacer 10 has a center opening or window 20 in which is disposed the cathode and which is communicated only with the oxidizing-gas supply passages 12 and the oxidizing-gas discharge passages 13 through tapered notches 21 and orifices 22 as best shown in FIG. 4.

Referring still to FIG. 3, the anode passage spacer 9 has a center opening or window 23 in which is disposed the anode 3 and which is communicated only with the fuel supply passages 14 and the fuel discharge passages 15 through tapered notches 24 and orifices 25.

Figure 5A:
FIGS. 5(A) and 5(B) show the examples of ridges and valleys on the separator wall when viewed in the direction indicated by the arrow V in FIG. 3.
Figure 5B:

The separator plate 8 has the corrugations or ridges and valleys 7 to define the passages at the lower surface for flowing the oxidizing gas from 12 to 13 and the passages at the top surface for flowing the fuel from 14 to 15. The corrugations 7 of the separator plate 8 may have various shapes as shown in FIGS. 5(A) and 5(B).

Disposed at the lower surface of the separator plate 8 is the cathode passage spacer 10 which is communicated only with the cathode 2 through the orifices 22, the tapered notches 21 and the window 20 and disposed at the upper surface of the separator plate 8 is the anode passage spacer 9 which is communicated only with the anode 3 though the orifices 25, the tapered notches 24 and the window 23. These spacers 9 and 10 are overlaid on and joined to the separator plate 8. Therefore it becomes possible to completely separate the oxidizing gas 4 and the fuel 5 to distribute and discharge them. Moreover, uniform distribution can be ensured.

In assembling these components are laid one upon another and bonded together so that the assembling is much simplified. Furthermore, the construction is simple and compact in size and no components must be fabricated with a higher degree of dimensional accurancy. Thus the laminated fuel cell in accordance with the present invention can be fabricated at less costs.

Figure 6:
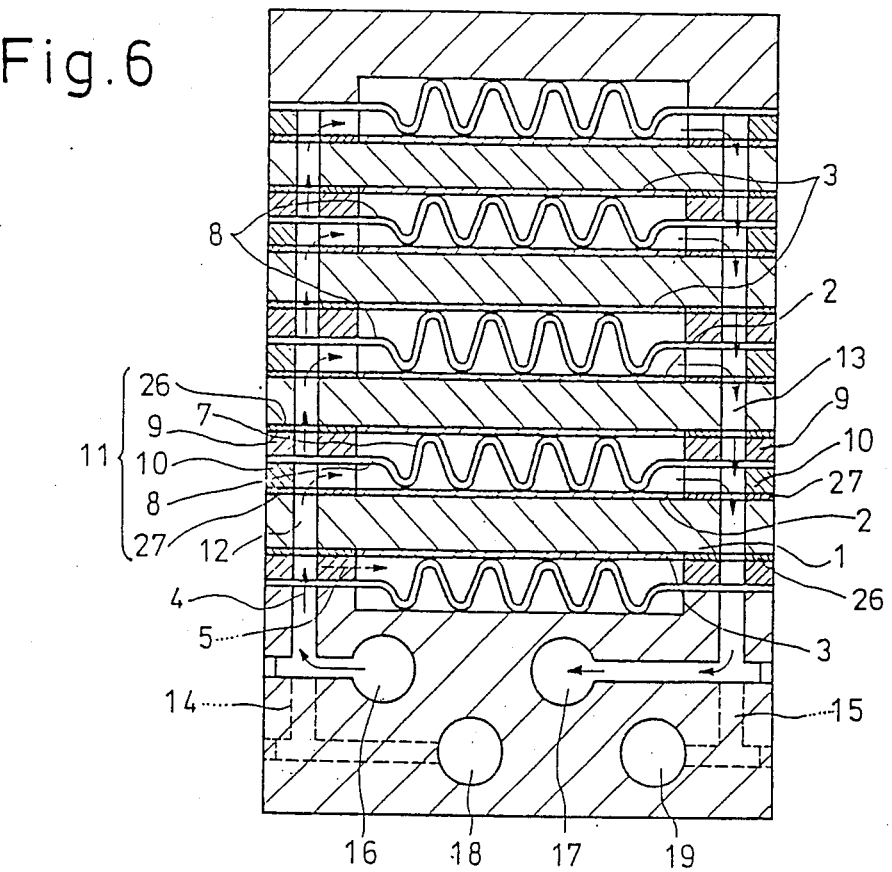
FIG. 6 is a longitudinal sectional view of a second embodiment of a laminated fuel cell in accordance with the present invention.

FIG. 6 shows a second embodiment of a laminated fuel cell in accordance with the present invention. Tiles 1 each of which is sandwiched between a cathode 2 and an anode 3 are stacked into a plurality of layers through current collector plate assemblies 11 each of which comprises a separator plate 8 with corrugations or ridges and valleys 7 and having an anode passage spacer 9 and an anode spacer 26 disposed on one surface and a cathode passage spacer 10 and a cathode spacer 27 disposed on the other surface, these spacers 9, 26, 10 and 27 being joined integral with the separator plate 8 by for example brazing.

A plurality of oxidizing-gas supply passages 12 extend at one side of the tiles 1 and the current collector plate assemblies 11 while a plurality of oxidizing-gas discharge passages 13 extend at the other side. A plurality of fuel supply passages 14 and a plurality of fuel discharge passages 15 extend alternately of the oxidizing-gas supply passages 12 and the oxidizing-gas discharge passages 13, respectively.

Figure 8:
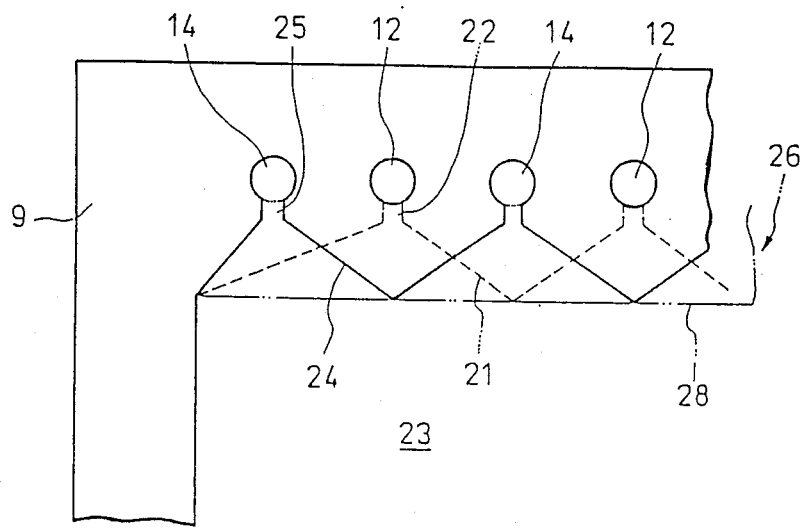
FIG. 8 is a view used to explain the gas separation effect of the current collector plate assembly shown in FIG. 6.
Figure 7:
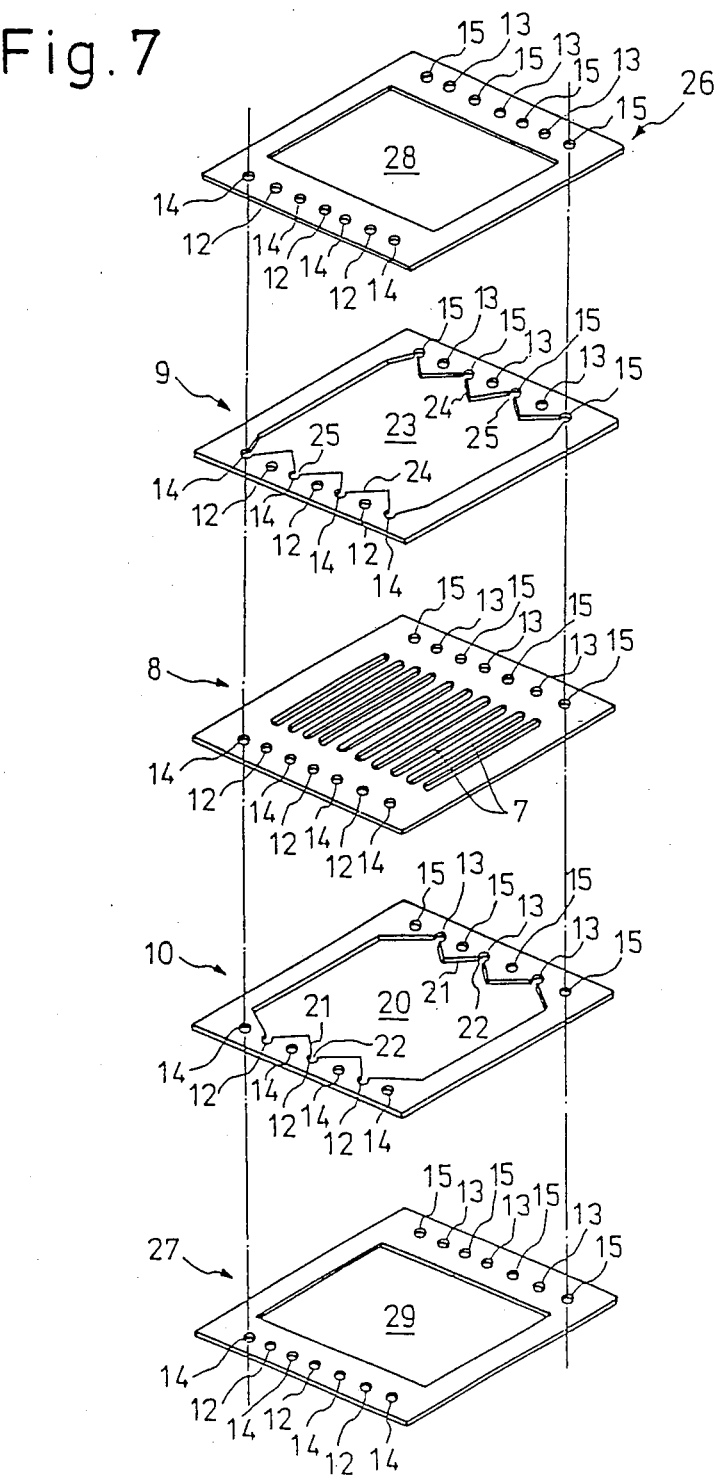
FIG. 7 is an exploded perspective view of the current collector plate assembly thereof.

Referring now to FIG. 7, the anode spacer 26 has a center rectangular opening or window 28 in which is disposed the anode 3 and which is communicated only with the fuel supply passages 14 and the fuel discharge passages 15 through tapered notches 24 and orifices 25 as best shown in FIG. 8.

The cathode spacer 27 has a center rectangular opening or window 29 in which is disposed the cathode 2 and which is communicated only with the oxidizing-gas passages 12 and the oxidizing-gas dishcarge passages 13 through tapered notches 21 and orifices 22.

The separator plate 8 has corrugations or ridges and valleys 7 to define the oxidizing-gas passages at the lower surface so that the oxidizing gas flows from 12 to 13 and the fuel passages at the upper surface so that the fuel flows from 14 to 15. The corrugations 7 may have various shapes as shown in FIGS. 5(A) and 5(B).

As described above, disposed over the lower surface of the separator plate 8 are the cathode passage spacer 10 and the cathode spacer 27 which are communicated only with the cathode 2 through the orifices, the tapered notches 21 and the window 20. Disposed over the upper surface of the separator plate 8 are the anode passage spacer 9 and the anode spacer 26 which are communicated only with the anode 3 through the orifices 25, the tapered notches 24 and the window 23. These spacers 10, 27, 9 and 26 are stacked and bonded togethr so that the oxidizing gas 4 and the fuel 5 can be completely separated from each other and distributed and then discharged.

As described above, the anode spacer 26 and the cathode spacer 27 have the rectangular windows 28 and 29, respectively, and, as shown in FIG. 8, can completely cover the orifices 22 and 25 and the tapered notches 21 and 24 of the anode and cathode passage spacers 9 and 10 so that the tile can be made into very intimate contact with the current collector plate assemblies 11, whereby highly reliable sealing is obtained. Therefore, the second embodiment of the present invention is adapted to ensure highly reliable sealing arrangements when the tiles 1 are thin or soft.

It is to be understood that the present invention is not limited to the above-described preferred embodiments thereof and that various modifications may be effected without departing the true spirit of the present invention. For instance, the spacers may have various desired shapes; instead of arranging the gas supply and discharge passages on the opposite sides on the current collector plate assembly, they may be alternately arranged on one and the same side.

The effects, features and advantages of the present invention may be summarized as follows:

(i) The cathode passage spacer, the separator plate and the anode passage spacer are joined integral by for example brazing into the current collector plate assembly. As a result, the supply of the oxidizing gas to the cathode and the supply of the fuel to the anode can be completely separated from each other so that highly reliable sealing can be ensured.

(ii) Since highly reliable sealing is ensured, safety of the laminated fuel cell in accordance with the present invention is ensured.

(iii) The laminated fuel cell can be assembled by simply laminating various components and is simple in construction and compact in size.

(iv) Since the laminated fuel cell in accordance with the present invention is simple in construction and does not need component parts with a high degree of dimensional accuracy so that it can be fabricated at low costs.

(v) Both the cathode passage spacer and the anode passage spacer are provided with orifices so that the oxidizing gas and the fuel can be uniformly distributed to the cathode and the anode, respectively.

(vi) In addition to the cathode passage spacer and the anode passage spacer, the cathode spacer for housing the cathode as well as the anode spacer for housing the anode may be provided so that even soft or thin tile can be completely supported such that the gas sealing portions are completely closed, whereby highly reliable sealing can be ensured.

What is claimed is:

1. In an inner manifold type laminated fuel cell wherein electrolytic plates are in the form of tiles and each is sandwiched by a cathode and an anode and is stacked one upon another through a separator plate into a plurality of layers, and fuel and oxidizing-gas supply passages extend on one side of the tiles while fuel and oxidizing-gas discharge passages extend on the other side of the tiles, whereby supply and discharge of oxidizing gas to and from said cathode are separated from supply and discharge of fuel to and from anode, an improvement comprising cathode passage spacers each disposed over a cathode side of the separator plate, each of said cathode passage spacers having a plurality of orifices along its width, a cathode window through which only said oxidizing-gas supply and discharge passages are communicated with said cathode and tapered notches through which said cathode orifices are connected with said cathode window, cathode spacers each disposed over the cathode side of the separator plate and having a rectangular window for housing the cathode, anode passage spacers each disposed over the anode side of the separator plate, each of said anode passage spacers having a plurality of orifices along its width, an anode window through which only said fuel supply and discharge passages are communicated with said anode and tapered notches through which said anode orifices are connected with said anode window, and anode spacers each disposed over the anode side of the separator plate and having a rectangular window for housing the anode, each of said orifices including an elongate passage fluidly connecting each of said supply and discharge passages to an associated one of said tapered notches whereby a uniform distribution of said fuel and said oxidizing gases over the surfaces of the anodes and the cathodes is provided.

2. A cell according to claim 1 wherein the separator plate and the cathode and anode passage spacers which sandwich said separator as well as the cathode and anode spacers are preliminarily joined integrally into a current collector plate assembly.

3. In a laminated fuel cell wherein electrolytic plates are in the form of tiles each sandwiched by a cathode and an anode and are stacked one upon another through a separator plate into a plurality of layers, and fuel and oxidizing-gas supply passages extend on one side of the tiles while fuel and oxidizing-gas discharge passages extend on the other side of the tiles, whereby supply and discharge of oxidizing gas to and from said cathode are separated from supply and discharge of fuel to and from said anode, an improvement comprising cathode passage spacers each disposed over a cathode side of the separator plate, each of said cathode passage spacers having orifices, a cathode window through which only said oxidizing-gas supply and discharge passages are communicated with said cathode, cathode spacers each disposed over the cathode side of the separator plate and having a rectangular window for housing the cathode and tapered notches through which said cathode orifices are connected with said cathode window, anode passage spacers each disposed over the anode side of the separator plate, each of said anode passage spacers having orifices, an anode window through which only said fuel supply and discharge passages are communicated with said anode and tapered notches through which said anode orifices are connected with said anode window, and anode spacers each disposed over the anode side of the separator plate and having a rectangular window for housing the anode, said anode spacer and said cathode spacer each having a covering portion for covering said anode passage spacer orifices and said cathode passage spacer orifices for ensuring secure fluid communication between said anode and said cathode and said fuel and oxidizing-gas passages respectfully, each of said orifices including an elongate passage fluidly connecting each of said supply and discharge passages to an associated one of said tapered notches whereby a uniform distribution of said fuel and said oxidizing gases over the surfaces of the anodes and the cathodes is provided.

* * * * *